US011525622B2

(12) United States Patent
Brown et al.

(10) Patent No.: US 11,525,622 B2
(45) Date of Patent: Dec. 13, 2022

(54) SYSTEMS AND METHODS FOR SEALING A REFRIGERATED GALLEY OF AN AIRCRAFT

(71) Applicant: The Boeing Company, Chicago, IL (US)

(72) Inventors: Douglas A. Brown, Chicago, IL (US); James P. Schalla, Chicago, IL (US); Justin W. Balvanz, Chicago, IL (US); Thomas J. Moran, Chicago, IL (US)

(73) Assignee: The Boeing Company, Chicago, IL (US)

( * ) Notice: Subject to any disclaimer, the term of this patent is extended or adjusted under 35 U.S.C. 154(b) by 789 days.

(21) Appl. No.: 16/451,080

(22) Filed: Jun. 25, 2019

(65) Prior Publication Data

US 2020/0408461 A1 Dec. 31, 2020

(51) Int. Cl.
| | |
|---|---|
| *F25D 23/08* | (2006.01) |
| *B64D 11/00* | (2006.01) |
| *B64D 11/04* | (2006.01) |
| *E06B 7/215* | (2006.01) |
| *F25D 23/02* | (2006.01) |

(52) U.S. Cl.
CPC ........ *F25D 23/087* (2013.01); *B64D 11/0007* (2013.01); *B64D 11/04* (2013.01); *E06B 7/215* (2013.01); *F25D 23/028* (2013.01)

(58) Field of Classification Search
CPC ....... B64D 11/007; B64D 11/04; E06B 7/215; F25D 23/028
See application file for complete search history.

(56) References Cited

U.S. PATENT DOCUMENTS

| | | |
|---|---|---|
| 3,871,133 A | 3/1975 | Ellingson, Jr. |
| 4,406,088 A | 9/1983 | Berndt, Jr. |
| (Continued) | | |

FOREIGN PATENT DOCUMENTS

| | | | |
|---|---|---|---|
| DE | 20 2007 016379 U1 | 4/2009 | |
| DE | 202007016379 U1 * | 5/2009 | ............... E06B 7/21 |
| (Continued) | | | |

OTHER PUBLICATIONS

DE-202007016379-U1 translation.*
Extended European Search Report prepared by the European Patent Office in application No. 20175135.1 dated Nov. 4, 2020.

*Primary Examiner* — Elizabeth J Martin
(74) *Attorney, Agent, or Firm* — McDonnell Boehnen Hulbert & Berghoff LLP (57) ABSTRACT

The present disclosure provides system for sealing a refrigerated galley of an aircraft. The system includes a door, and a seal assembly positioned at a bottom surface of the door. The seal assembly includes (i) a housing coupled to the bottom surface of the door, (ii) a seal positioned at least partially in the housing, wherein the seal is moveable relative to the housing and the door, (iii) a biasing mechanism coupled to the housing and the seal and configured to hold the seal in a relaxed state by applying a biasing force to the seal in a direction away from a floor surface of the refrigerated galley, and (iv) an activation mechanism coupled to the housing. The activation mechanism is configured to transition the seal from the relaxed state to a compressed state in response to a rotation of the door from an open position to a closed position.

20 Claims, 10 Drawing Sheets

(56) References Cited

U.S. PATENT DOCUMENTS

2013/0219792 A1\* 8/2013 Parker ................... E06B 7/215
  49/306
2019/0002105 A1\* 1/2019 Moran ............... B64D 11/0007

FOREIGN PATENT DOCUMENTS

| EP | 1 347 146 A2 | 9/2003 | | |
|----|--------------|--------|----|------------|
| EP | 1347146 A2 * | 9/2003 | ............ | E06B 7/215 |
| EP | 2 770 152 A1 | 8/2014 | | |

\* cited by examiner

COUPLING A DOOR TO A DOOR FRAME ABOVE A FLOOR SURFACE OF THE AIRCRAFT GALLEY TO CLOSE A GALLEY CART COMPARTMENT, WHEREIN THE DOOR ROTATES FROM A CLOSED POSITION TO AN OPEN POSITION — 202

COUPLING THE HOUSING TO A BOTTOM SURFACE OF THE DOOR SUCH THAT THE SEAL IS CONFIGURED TO CONTACT THE FLOOR SURFACE WHEN THE DOOR IS IN THE CLOSED POSITION — 204

COUPLING THE BIASING MECHANISM TO THE DOOR AND TO THE HOUSING TO HOLD THE SEAL IN A RELAXED STATE BY APPLYING A BIASING FORCE TO THE SEAL IN A DIRECTION AWAY FROM THE FLOOR SURFACE — 206

COUPLING AN ACTIVATION MECHANISM PROXIMATE TO THE DOOR FRAME TO INTERACT WITH THE HOUSING TO OVERCOME THE BIASING FORCE TO TRANSITION THE SEAL FROM THE RELAXED STATE TO A COMPRESSED STATE IN RESPONSE TO A ROTATION OF THE DOOR FROM THE OPEN POSITION TO THE CLOSED POSITION TO THEREBY SEAL THE GALLEY — 208

FIG. 10

SYSTEMS AND METHODS FOR SEALING A REFRIGERATED GALLEY OF AN AIRCRAFT

FIELD

The present disclosure relates generally to a system for sealing a refrigerated compartment, and more particularly, to a system to lift a seal positioned on a bottom surface of a door when the door is opened to prevent the seal from dragging along the floor surface when the door is opened.

BACKGROUND

Aircraft galley cart compartments are often refrigerated to keep the contents therein cold. Traditional galley doors in such refrigerated sections use seals to keep the compartment cold. To maximize the internal volume of the compartment, the doors extend to the floor surface, and the seal is positioned along the bottom surface of the door and contacts the floor surface. Existing seals on traditional galley doors may be more accurately described as close-outs. Such seals are typically "whisker brush" devices that allow air flow thru the whiskers and additionally are not fully sealed against the floor surface due to their inability to flex and conform to the floor surface. Further, such a seal is prone to wear and tear as the door is opened and closed as such actions cause the seal to drag along the floor surface. Eventually the seal is replaced during maintenance as it becomes worn. Prior to replacement, a worn seal may enable cooled air to leak from the enclosed galley cart compartment, causing the airplane environmental control systems to work harder than necessary to maintain the appropriate temperature. As such, a need exists for a seal system for the bottom surface of the galley door that has an extended life and improved thermal sealing characteristics.

SUMMARY

In one aspect, the present disclosure provides a system for sealing a refrigerated galley of an aircraft. The system includes (a) a door having a top surface, a bottom surface opposite the top surface, a first side surface, and a second side surface opposite the first side surface, and (b) a seal assembly positioned at the bottom surface of the door. The seal assembly includes (i) a housing coupled to the bottom surface of the door, (ii) a seal positioned at least partially in the housing, wherein the seal is moveable relative to the housing and the door, (iii) a biasing mechanism coupled to the housing and the seal, wherein the biasing mechanism is configured to hold the seal in a relaxed state by applying a biasing force to the seal in a direction away from a floor surface of the refrigerated galley, and (iv) an activation mechanism coupled to the housing, wherein the activation mechanism is configured to transition the seal from the relaxed state to a compressed state in response to a rotation of the door from an open position to a closed position, wherein a height of the seal is greater in the relaxed state than in the compressed state.

In another aspect, the present disclosure provides a galley for an aircraft. The galley includes (a) a refrigerated cart compartment, (b) a door frame defining a front wall of the refrigerated cart compartment, (c) a door coupled to the door frame at a hinge, the door having a top surface, a bottom surface opposite the top surface, a first side surface, and a second side surface opposite the first side surface, and (d) a seal assembly positioned at the bottom surface of the door. The seal assembly includes (i) a housing coupled to the bottom surface of the door, (ii) a seal positioned at least partially in the housing, wherein the seal is moveable relative to the housing and the door, (iii) a biasing mechanism coupled to the housing and the seal, wherein the biasing mechanism is configured to hold the seal in a relaxed state by applying a biasing force to the seal in a direction away from a floor surface of the galley, and (iv) an activation mechanism coupled to the housing, wherein the activation mechanism is configured to transition the seal from the relaxed state to a compressed state in response to a rotation of the door from an open position to a closed position, wherein a height of the seal is greater in the relaxed state than in the compressed state.

In yet another aspect, the present disclosure provides a method of assembling an aircraft galley with a seal assembly including a housing, a seal coupled to the housing, and a biasing mechanism coupled to the housing. The method includes coupling a door to a door frame above a floor surface of the aircraft galley to close a galley cart compartment, wherein the door rotates from a closed position to an open position. The method also includes coupling the housing to a bottom surface of the door such that the seal is configured to contact the floor surface when the door is in the closed position. The method also includes coupling the biasing mechanism to the door and to the housing to hold the seal in a relaxed state by applying a biasing force to the seal in a direction away from the floor surface. The method also includes coupling an activation mechanism proximate to the door frame to interact with the housing to overcome the biasing force to transition the seal from the relaxed state to a compressed state in response to a rotation of the door from the open position to the closed position to thereby seal the aircraft galley, wherein a height of the seal is greater in the relaxed state than in the compressed state.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

A seal assembly for a galley is provided for an aircraft that seals against a sealing surface of the galley, which may be against the floor or against another surface, such as part of the door frame of the galley. For example, the seal at the seal edge is configured to seal against the door frame between the floor and the bottom of the door to prevent side leakage. The seal is movable to a relaxed state and held in the relaxed state as the door is opened and closed to prevent damage and wear to the seal. In various embodiments, the seal is movably coupled to the door and moved between the relaxed state and a compressed state in which the seal contacts the sealing surface of the galley. In other various embodiments, the seal is movably coupled to the door frame and moved between the relaxed state and the compressed state, such as by the opening and closing action of the door. A more compliant seal can be used, which provides better, more efficient sealing than conventional blade seals or brush seals because the seal is not subjected to wear and tear during opening and closing of the door. Various embodiments of the seal assembly provide a biasing mechanism to hold the seal in the relaxed state and an activation mechanism to transition the seal to the compressed state when the door is closed. In various embodiments, the activation mechanism automatically closes the seal by closing the door and automatically opens the seal by opening the door. Illustrative, non-exhaustive examples, which may or may not be claimed, of the subject matter according the present disclosure are provided below.

Figures 1, 2:
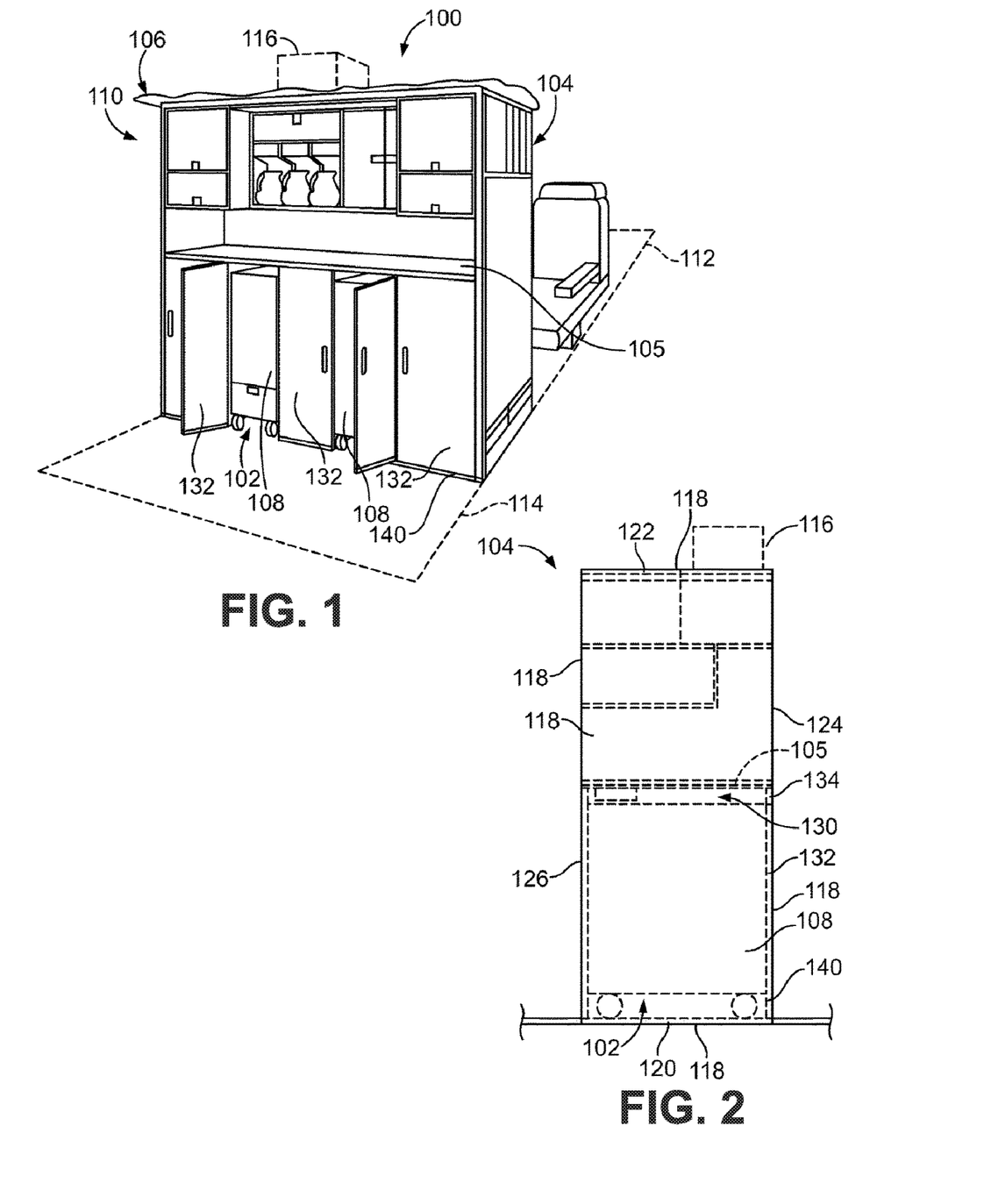
FIG. 1 illustrates an exemplary galley system for an aircraft.
FIG. 2 illustrates a side view of the galley in accordance with an exemplary embodiment.

With reference to the Figures, FIG. 1 is a schematic illustration of an exemplary system 100 for an aircraft 106. The system 100 is used to cool galley carts 108 held in cart compartments 102 of a galley 104. The galley 104 defines one or more cart compartments 102, which are typically arranged below a counter 105 of the galley 104. The cart compartments 102 are closed by doors 132 having seal assemblies 140 for sealing the cart compartments 102, such as at the floor surface and/or around the door frames. Each cart compartment 102 may hold any number of galley carts 108. The galley 104 may be used for the storage and/or preparation of food or beverages. The galley 104 is positioned within a cabin 110 of the aircraft 106, and the cabin of the aircraft 106 is divided into a passenger area 112 and a galley area 114. The galley area 114 has a working area for the galley crew forward of the galley 104 where the cart compartments 102, counter 105 and cabinets or storage bins may be accessed.

As used herein a "cart compartment" is an insulated volume that is utilized to store one or more galley carts on the aircraft 106. A "galley cart", as used herein, is a portable device that is used to store food and/or beverages that are transported from a caterer to the aircraft 106 or from the cart compartments 102 to other parts of the aircraft 106 for serving the food and/or beverages. The galley carts may include wheels, however some galley carts may be hand carried boxes in some embodiments.

The system 100 includes a cooling system having one or more heat exchangers 116 that provides cooled air for the galley carts 108 in the cart compartment 102. The cooled air from the heat exchangers 116 flows into and out of the cart compartments 102 through supply or return ducts in the rear wall of the galley 104.

Figure 3:
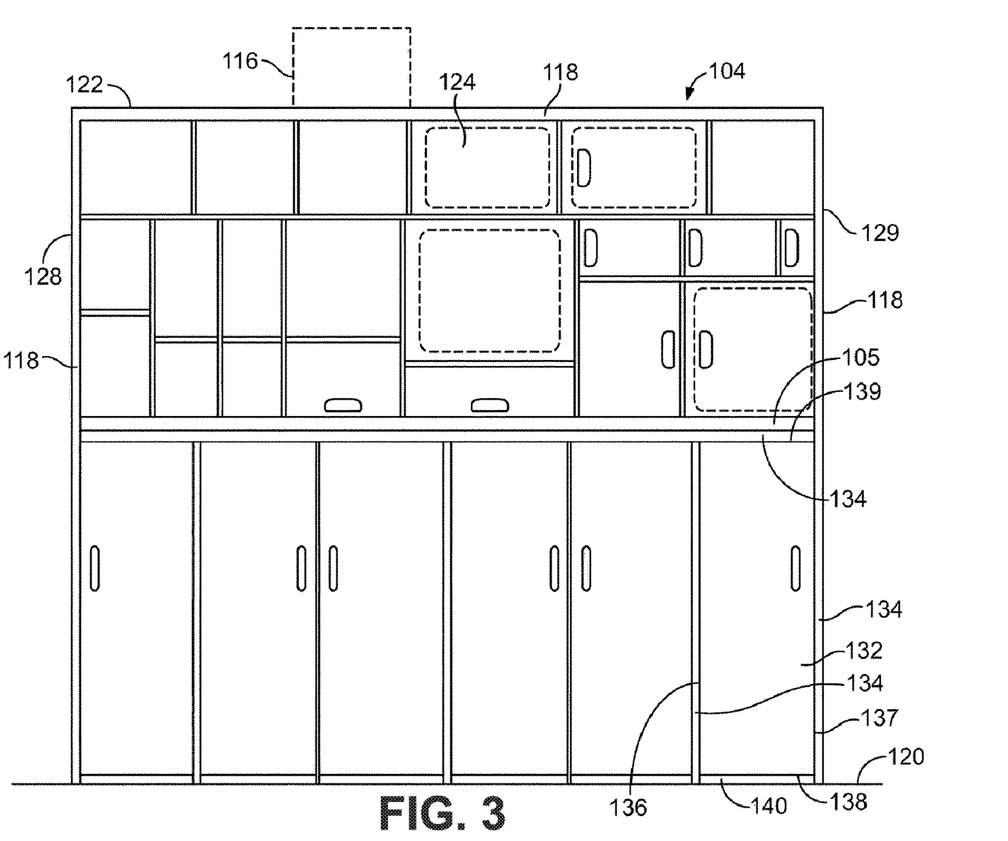
FIG. 3 illustrates a front view of the galley in accordance with an exemplary embodiment.

FIG. 2 is a side view of the galley 104 in accordance with an exemplary embodiment. FIG. 3 is a front view of the galley 104 in accordance with an exemplary embodiment. The galley 104 includes walls 118 or partitions defining a floor surface 120, a top 122, a front 124, a rear 126 opposite the front 124, and opposite sides 128, 129 (which may also be referred to as floor surface 120, top wall 122, front wall 124, rear wall 126, and side walls 128, 129). The counter 105 extends between the sides 128, 129 at a height approximately centered between the floor surface 120 and the top 122. The floor surface 120 may be the bottom or bottom wall of the galley 104, for example.

The cart compartment 102 is positioned below the counter 105 and may be at least partially defined by the walls 118 of the galley 104. The cart compartment 102 defines a chamber 130 configured to receive the galley carts 108. In an exemplary embodiment, the doors 132 are provided at the front 124 of the galley 104 that close the cart compartment 102. The doors 132 are received in door frames 134 and, in the illustrated embodiment, are hingedly coupled to the door frames 134 at one of the first side surface 136 or the second side surface 137 of the corresponding door 132. The doors 132 are used to hold the galley carts 108 in the cart compartment 102. The doors 132 are also used to contain the cooled air in the cart compartment 102, and may further provide thermal insulation. A bottom surface 138 of each door 132 faces the floor surface 120. In an exemplary embodiment, when the galley carts 108 are positioned in the chamber 130, a space is defined about the galley cart 108, such as in front of the galley carts 108, behind the galley carts 108, above the galley carts 108, and the like to allow air to flow around the galley carts 108 in the space.

The galley 104 includes a seal assembly 140 on each door 132 for sealing the cart compartment 102. In the illustrated embodiment, the seal assembly 140 is provided at the bottom surface 138 of the door 132 to seal between the bottom surface 138 of the door and the floor surface 120. However, the seal assembly 140 may additionally or alternatively be provided at other areas of the door 132, such as along the first side surface 136, the second side surface 137, or a top surface 139 of the door 132. Optionally, multiple seal assemblies 140 may be provided to seal against multiple surfaces. In other various embodiments, the seal assembly 140 may be coupled to the door frame 134 rather than the door 132 to seal between the door frame 134 and the door 132, such as at the space between the bottom surface 138 of the door 132 and the floor surface 120.

Figure 4:
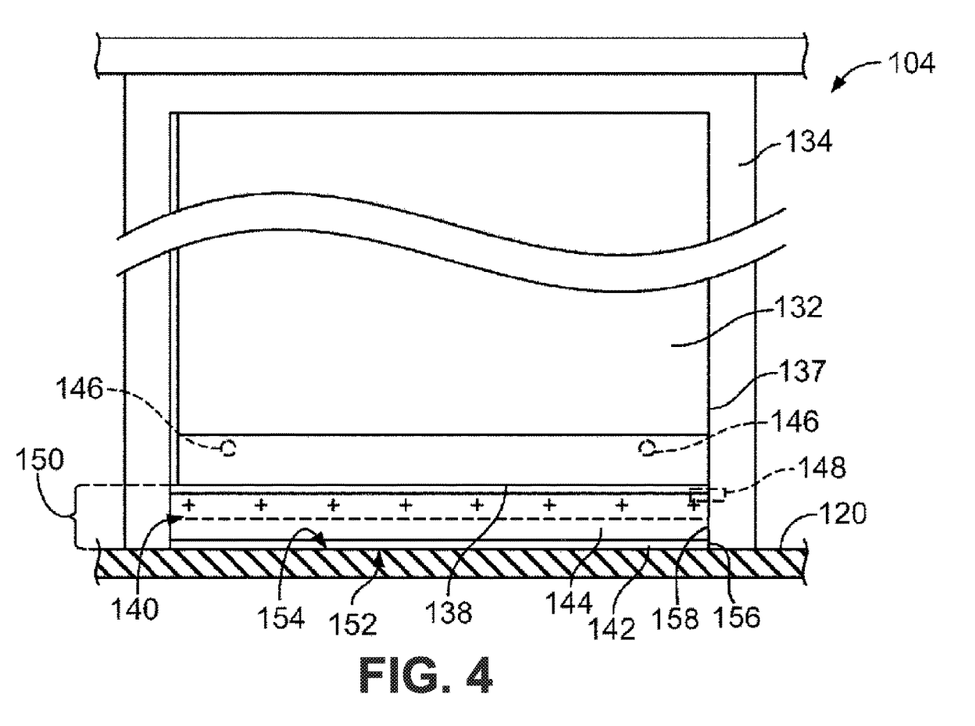
FIG. 4 illustrates a front view of a portion of the galley showing a door in a closed position illustrating a seal assembly in accordance with an exemplary embodiment in a compressed state.

FIG. 4 is a front view of a portion of the galley 104 showing the door 132 in a closed position illustrating the seal assembly 140 in a compressed state between the bottom surface 138 of the door 132 and the floor surface 120. The seal assembly 140 includes a seal 142 configured to be movably coupled to the door 132 and a housing 144 holding the seal 142. The housing 144 may be coupled to the bottom surface 138 of the door 132, and the seal 142 is positioned at least partially in the housing 144. In one example, the seal 142 is removably positioned in the housing 144. Such an embodiment may provide easy cleaning of the seal 142 and/or replacement of the seal 142 as necessary. The seal assembly 140 includes at least one biasing mechanism 146 coupled to the housing 144 and the seal 142 and configured to hold the seal 142 in a relaxed state by applying a biasing force to the seal 142 in a direction away from the floor surface 120 of the galley 104. The seal assembly 140 includes at least one activation mechanism 148 operably engaging the housing 144 to hold the seal 142 in the compressed state.

The biasing mechanism 146 is configured to hold the seal 142 in the relaxed state by applying a biasing force to the housing 144. For example, the biasing mechanism 146 may open the seal assembly 140 prior to opening the door 132 or simultaneously as the door 132 is being opened. The activation mechanism 148 is configured to overcome the biasing force to transition the seal 142 from the relaxed state to the compressed state in response to a rotation of the door 132 from an open position to a closed position, or simultaneously as the door 132 is being closed, such as immediately before the door 132 is moved to the closed position. For example, as the door 132 is being closed, the seal assembly 140 remains open but as the door 132 approaches the closed position, the activation mechanism 148 may be used to move the seal 142 to the compressed state.

In the illustrated embodiment, the seal assembly 140 is provided at the bottom surface 138 of the door 132 and closes off a space 150 between the bottom surface 138 of the door 132 and the floor surface 120. In an exemplary embodiment, at least a portion of the housing 144 may extend into the door 132 and at least a portion of the housing 144 may extend below the bottom surface 138 of the door 132.

The seal 142 is provided at the bottom of the housing 144. The seal 142 includes a seal interface 152 configured to engage a sealing surface 154 along the floor surface 120. In an exemplary embodiment, side edges 156 of the seal 142 are configured to engage sealing surfaces 158 along the door frame 134 that extends between the floor surface 120 and the bottom surface 138 of the door 132 to provide side sealing along the side of the seal 142 and prevent side leakage at the door frame 134. In the illustrated embodiment, the seal assembly 140 includes a plurality of biasing mechanisms 146 spaced apart along a width of the seal assembly 140 for biasing against different portions of the housing 144 and seal 142. In the illustrated embodiment, the activation mechanism 148 is coupled to the door frame 134 at the second side surface 137 of the door 132. A portion of the activation mechanism 148 is configured to extend into the door 132 to engage the housing 144 for closing the seal assembly 140 when the door 132 is closed. In other various embodiments, the seal assembly 140 may include multiple activation mechanisms 148 configured to engage different portions of the housing 144.

In various embodiments, another seal assembly (not shown) may be provided at the sides of the door 132 for sealing at the door frame 134 in the space between the floor surface 120 and the bottom surface 138 of the door 132, such as at the sealing surfaces 158. In various embodiments, the seal assembly may be coupled to the door and movable with the door 132. In other embodiments, the seal assembly may be coupled to the door frame 134. The seal assembly may seal against the seal 142, the housing 144 or another element. The seal assembly may be movable between opened and sealed positions to reduce wear. For example, the seal assembly may be automatically moved between the relaxed and compressed states by the opening and closing actions of the door 132.

Figure 5:
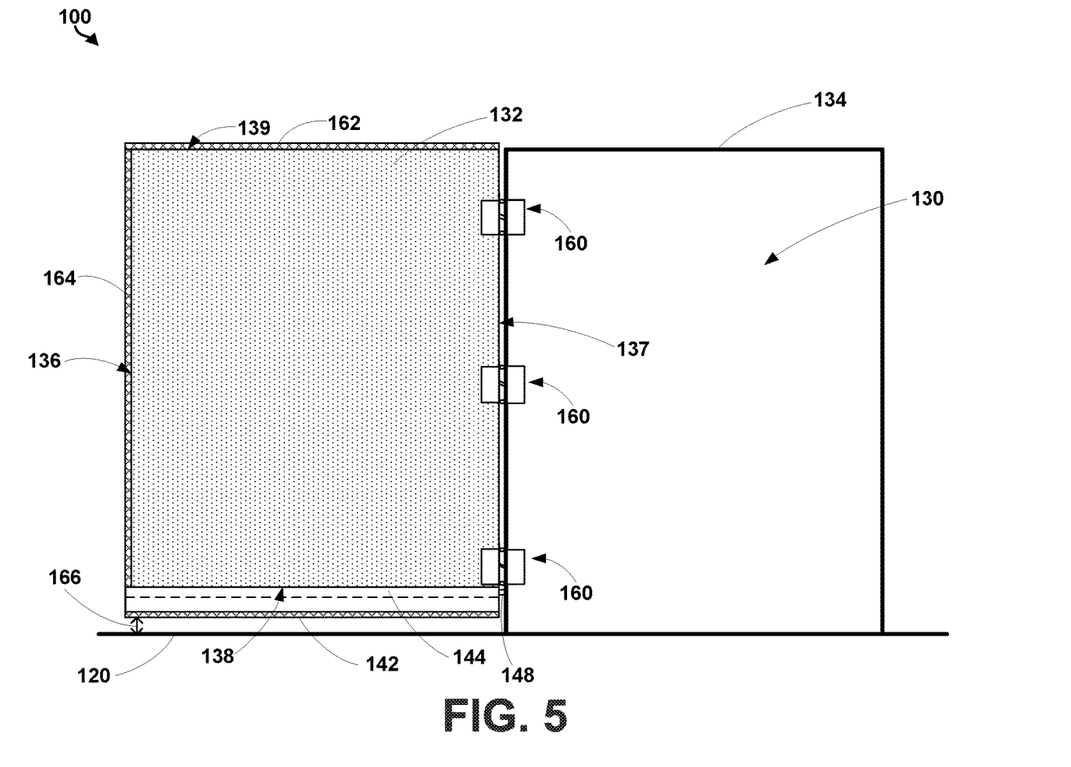
FIG. 5 illustrates a front view of a portion of the galley showing a door in an open position illustrating a seal assembly in accordance with an exemplary embodiment in a relaxed state.

FIG. 5 is a front view of a portion of the galley 104 showing the door 132 in an open position illustrating the seal assembly 140 in a relaxed state between the bottom surface 138 of the door 132 and the floor surface 120. As shown in FIGS. 4-5, the seal 142 transitions from a compressed state (shown in FIG. 4) to a relaxed state (shown in FIG. 5) in response to the rotation of the door 132 from the closed position to the open position. In one example, a height of the seal 142 is greater in the relaxed state than in the compressed state. As shown in FIG. 5, when the seal 142 transitions to the relaxed state, the seal 142 may move vertically with respect to the door 132 and may be positioned at least partially within the housing 144 of the seal assembly 140. The vertical translation of the seal 142 with respect to the door 132 from the compressed state to the relaxed state may range from about 0.016 inches to about 0.25 inches, as non-limiting examples. As further shown in FIG. 5, as the door opens a gap 166 is created between the seal 142 and the floor surface 120. Such a gap 166 prevents the seal 142 from dragging along the floor surface 120 as the door 132 is opened and closed, thereby improving the seal between the door 132 and the floor surface 120 as well as increasing the shelf life of the seal 142.

In one example, as illustrated in FIG. 5, the system 100 includes one or more hinges 160 coupled to the second side surface 137 of the door 132. In another example, the system 100 includes two hinges 160 coupled to the first side surface 136 of the door 132. In another example, the system 100 includes three hinges 160 coupled to the first side surface 136 of the door 132. In yet another example, the system 100 includes a plurality of hinges 160 extending an entire length of the second side surface 137. Other numbers of hinges are possible as well.

The seal 142 described herein may take a variety of forms. In one example, the seal comprises a brush material. In another example, the seal 142 may comprise a compressible elastomeric material such as natural rubber, styrene-butadiene rubber (SBR), neoprene, ethylene propylene diene monomer (EPDM), nitrile, butyl, or silicone, as non-limiting examples. In such an example, the durometer of the seal 142 may range from about Shore OO 30 to about Shore A 40, as non-limiting examples. In another example, the seal 142 may comprise a foam material such as high density Expanded Polypropylene (EPP), Ethylene-Vinyl Acetate (EVA), or Polyethylene-Vinyl Acetate (PEVA), as non-limiting examples. The seal 142 may comprise a bulb seal, a foam seal, or any other compressive seal. The use of a compressive seal enables the door to use compressive force to conform the seal 142 to the shape of the floor surface 120, thereby providing an improved seal between the bottom surface 138 of the door 132 and the floor surface 120. Such an arrangement may be particularly useful in the galley 104 of an aircraft as the floor surface 120 may include non-slip ridges that make sealing of the floor surface 120 more difficult than a flat surface. In yet another example, the seal 142 comprises a combination of a compressible elastomeric material and a brush material. Such an arrangement may provide the benefit of a brush material seal to help seal around the ridges in the floor surface 120 of the galley 104, while also maintaining the benefit of the compressive elastomeric material seal to provide improved sealing between the ridges in the floor surface 120. Other arrangements of the seal 142 are possible as well.

In one example, the seal 142 positioned on the bottom surface 138 of the door 132 comprises a first seal. In such an example, as shown in FIG. 5, the system 100 may further include a second seal 162 positioned on the top surface 139 of the door 132, and a third seal 164 positioned on the second side surface 137 of the door 132. In one example, the seal 142 comprises the same material as the second seal 162 and the third seal 164. In another example, the seal 142 comprises a first material, while the second seal 162 and the third seal 164 comprise a second material that is different than the first material. The combination of the seal 142, the second seal 162, and the third seal 164 help to seal all sides of the refrigerated chamber 130 of the cart compartment 102 when the door 132 is in the closed position. In addition to assisting in sealing the chamber 130, the second seal 162 and the third seal 164 may create a soft close feature of the door 132, thereby preventing the door 132 from slamming shut when in use.

Figure 6A:
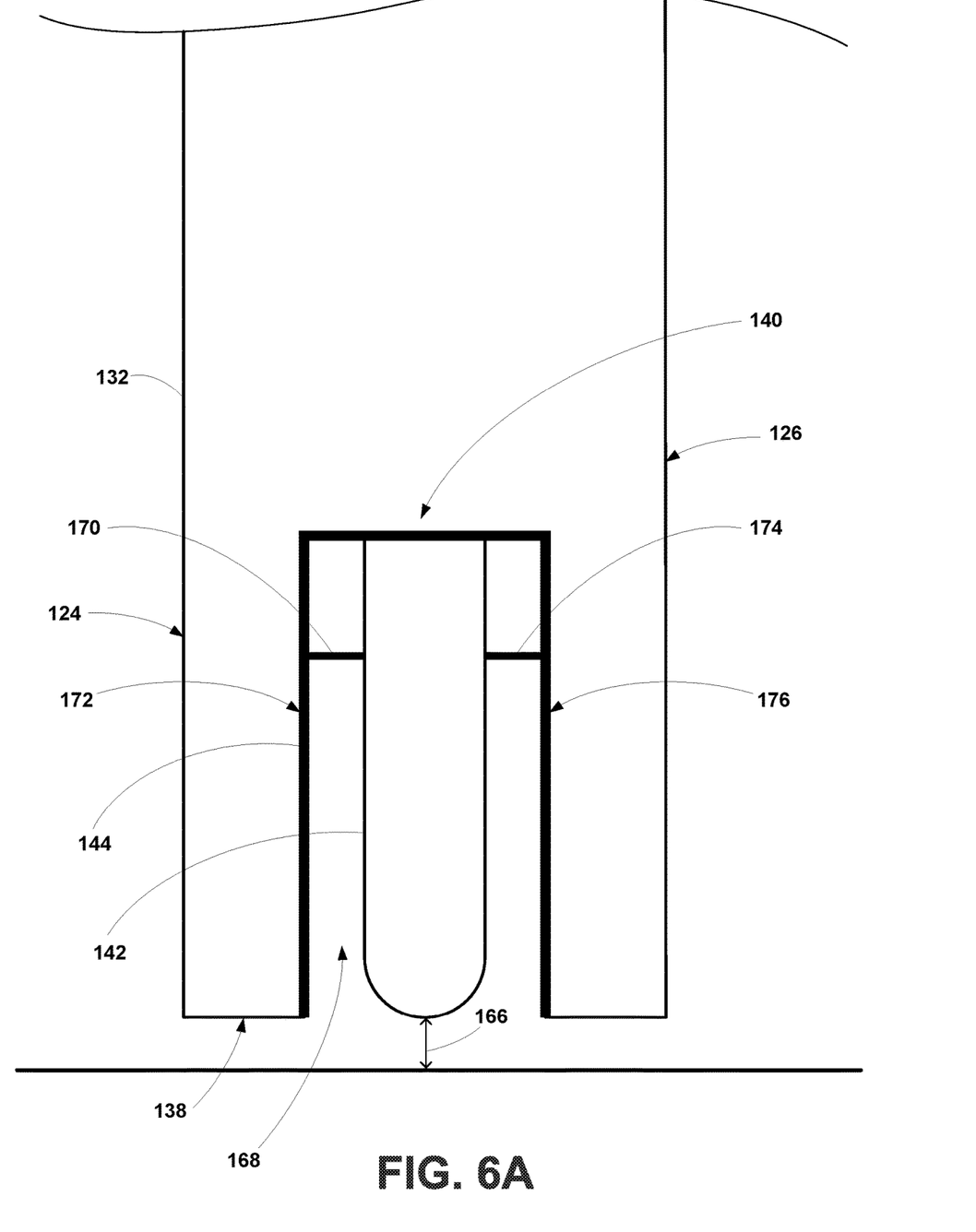
FIG. 6A illustrates a side view of the seal assembly of the galley system in accordance with an exemplary embodiment in a relaxed state.
Figure 6B:
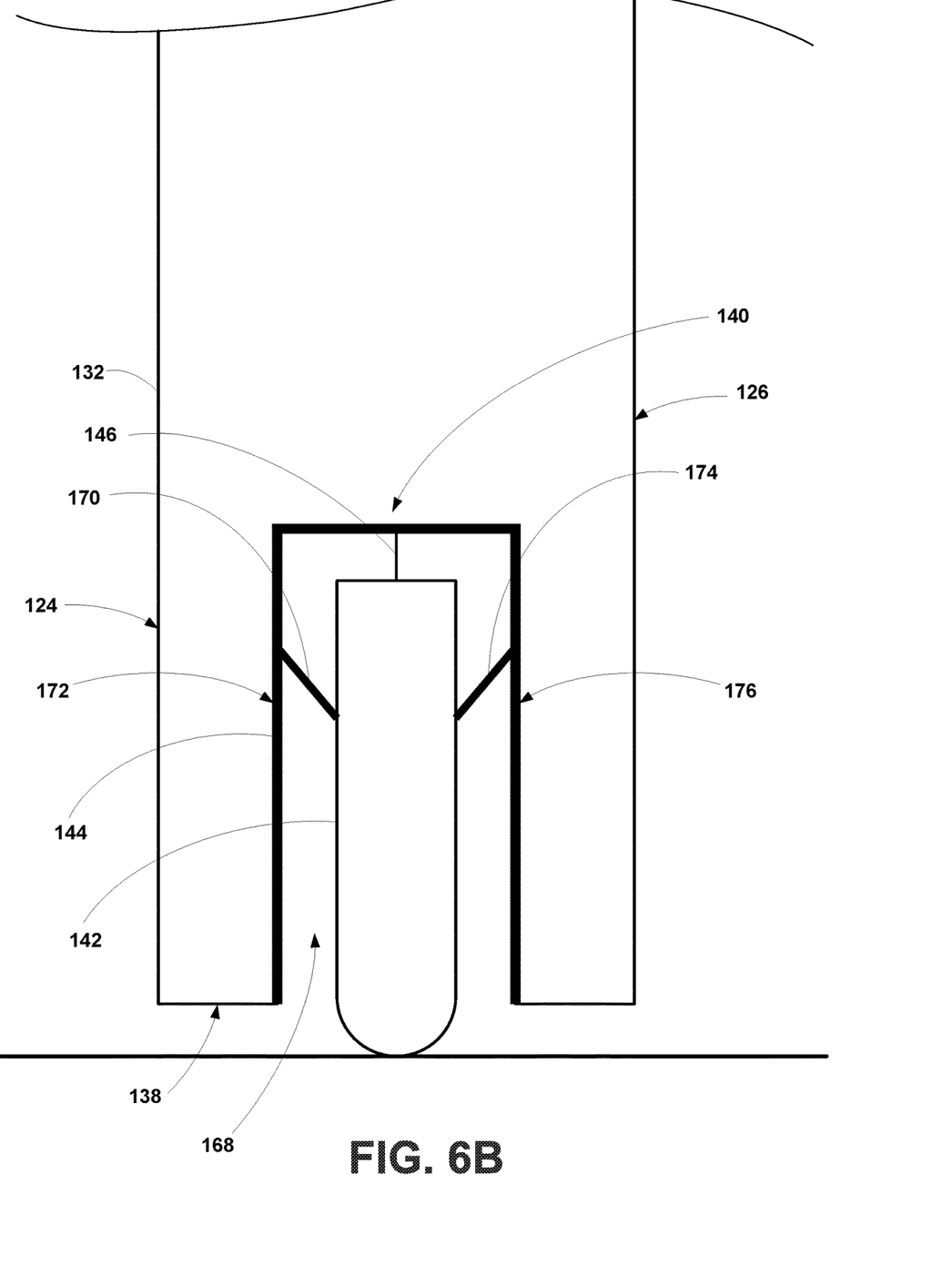
FIG. 6B illustrates a side view of the seal assembly of the galley system in accordance with an exemplary embodiment in a compressed state.

FIG. 6A illustrates a side view of the seal assembly 140 of the system 100 in a relaxed state, and FIG. 6B illustrates a side view of the seal assembly 140 of FIG. 6A in a compressed state. As shown in FIGS. 6A-6B, the bottom surface 138 of the door 132 includes a cavity 168 between the front wall 124 of the door 132 and the rear wall 126 of the door, and the housing 144 is positioned at least partially in the cavity 168. As further shown in FIGS. 6A-6B, the seal assembly 140 may further include a first edge seal 170 positioned between the housing 144 and the seal 142 adjacent a first side 172 of the housing 144, and a second edge seal 174 positioned between the housing 144 and the seal 142 adjacent a second side 176 of the housing 144 opposite the first side 172 of the housing 144. The first edge seal 170 and the second edge seal 174 may help prevent refrigerated air from exiting the refrigerated galley 104 of the aircraft when the door 132 is in the closed position and the seal 142 is in the compressed state. The first edge seal 170 and the second edge seal 174 may comprise an elastomeric material configured to stretch when in use. As such, and as shown in FIG. 6B, as the first edge seal 170 may be fixedly coupled to the seal 142 and fixedly coupled to the first side 172 of the housing 144, and the second edge seal 174 may be fixedly coupled to the seal 142 and fixedly coupled to the second side 176 of the housing 144. As the seal 142 transitions from the relaxed state to the compressed state and seals against the floor surface 120, the first edge seal 170 and the second edge seal 174 stretch to seal the edges of the seal 142 and prevent refrigerated air from exiting the refrigerated galley 104.

Figure 7A:
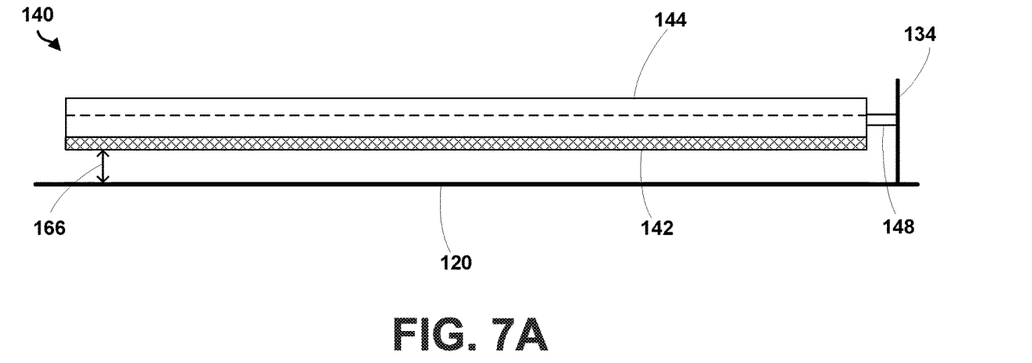
FIG. 7A illustrates a front view of the seal assembly of the galley system in accordance with an exemplary embodiment in a relaxed state.
Figure 7B:
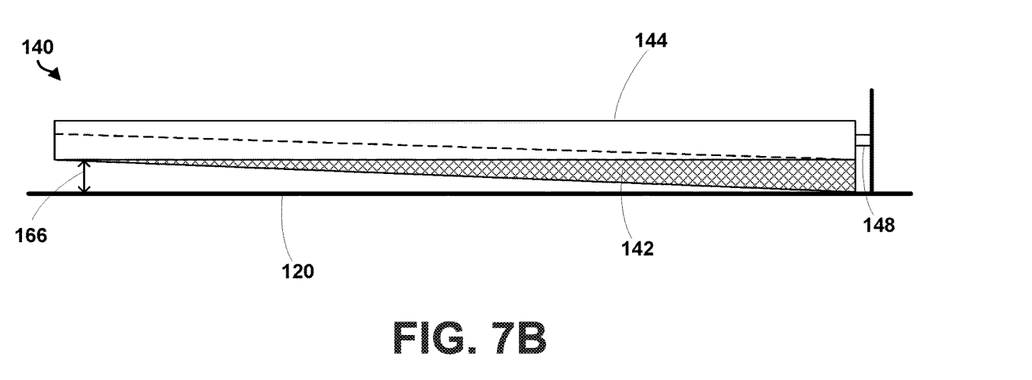
FIG. 7B illustrates a front view of the seal assembly of the galley system in accordance with an exemplary embodiment in a transition state.
Figure 7C:
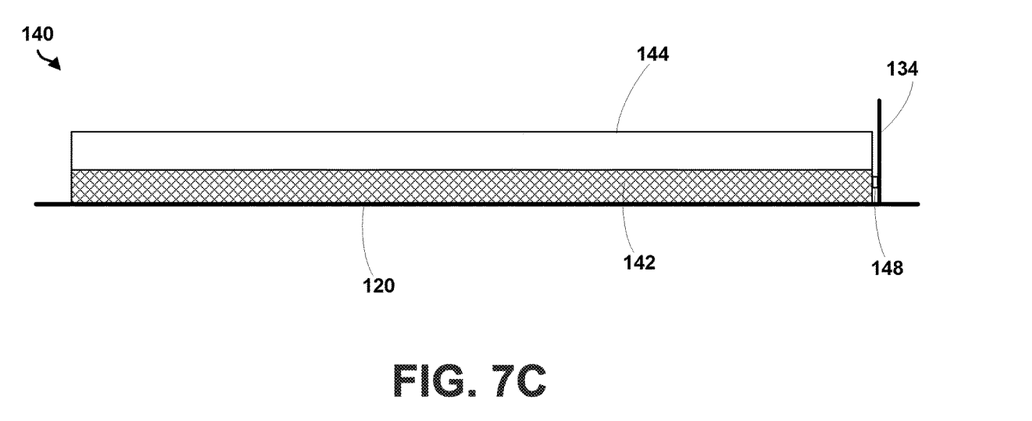
FIG. 7C illustrates a front view of the seal assembly of the galley system in accordance with an exemplary embodiment in a compressed state.

In one embodiment, as the seal 142 transitions from a compressed state to a relaxed state in response to the rotation of the door 132 from the closed position to the open position, the seal 142 translates vertically towards the floor surface 120 in a uniform fashion along the length of the seal 142. In another example, as shown in FIGS. 7A-7C, as the seal 142 transitions from a compressed state to a relaxed state in response to the rotation of the door 132 from the closed position to the open position, a portion of the seal 142 closer to the activation mechanism 148 translates vertically before a portion of the seal 142 further away from the activation mechanism 148. Such an arrangement may help ensure a smooth closing of the door 132 when in use.

As discussed above, the seal assembly 140 includes at least one biasing mechanism 146 coupled to the housing 144 and the seal 142 and configured to hold the seal 142 in a relaxed state by applying a biasing force to the seal 142 in a direction away from the floor surface 120 of the galley 104. The biasing mechanism 146 may take a variety of forms. In one example, the biasing mechanism comprises a leaf spring, as shown in FIGS. 8A-8B and 9A-9B. In another example, the biasing mechanism 146 comprises a compression spring. Other biasing mechanisms are possible as well. In one example, the biasing mechanism 146 comprises a first biasing mechanism, and the system 100 further comprises a second biasing mechanism (not shown) coupled to the housing 144 and the seal 142. In such an example, the second biasing mechanism may be positioned in parallel with the first biasing mechanism.

Figure 8A:
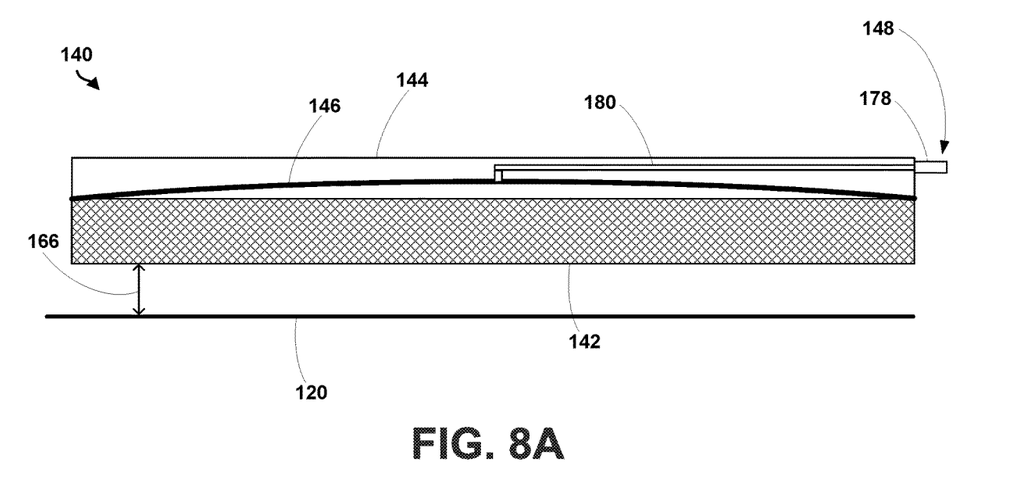
FIG. 8A illustrates a cross-sectional view of an example seal assembly of the galley system in accordance with an exemplary embodiment in a relaxed state.
Figure 8B:
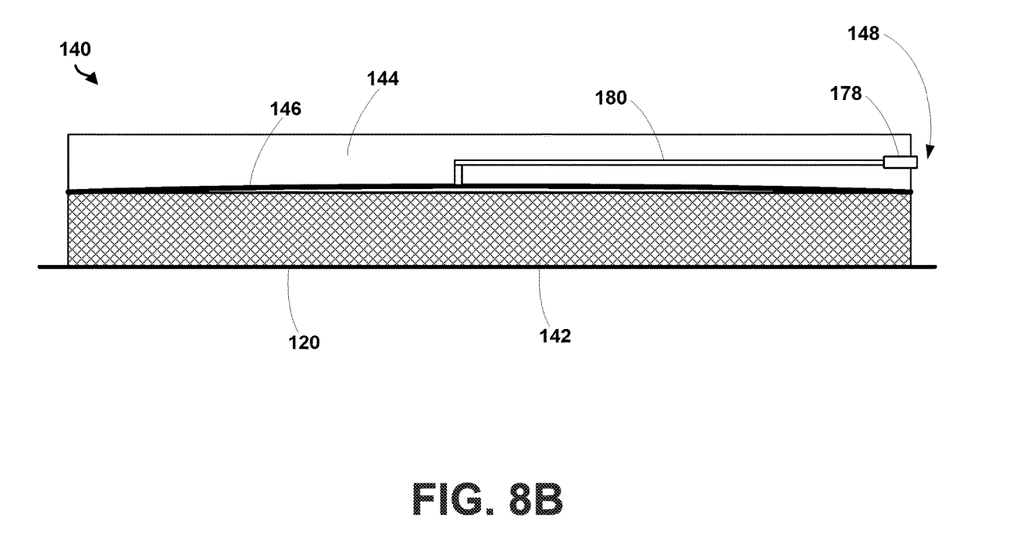
FIG. 8B illustrates a cross-sectional view of the example seal assembly of FIG. 8A in accordance with an exemplary embodiment in a compressed state.

As discussed above, the activation mechanism 148 is configured to overcome the biasing force to transition the seal 142 from the relaxed state to the compressed state in response to a rotation of the door 132 from an open position to a closed position. The activation mechanism 148 may take a variety of forms. In one example, as shown in FIGS. 8A-8B, the activation mechanism 148 comprises an actuator pin 178 extending away from the housing 144. Further, as shown in FIGS. 8A-8B, the activation mechanism 148 further comprises a rod 180 coupled to the actuator pin 178 and extending into the housing 144, and the rod 180 is further coupled to the biasing mechanism 146. In such an example, as the actuator pin 178 is depressed as the door 132 transitions from the open position to the closed position. As the actuator pin 178 is depressed, the rod 180 moves further into the housing 144, which in turn pushes the biasing mechanism 146 and seal 142 towards the floor surface 120 to transition the seal 142 to the compressed state. As the door 132 transitions back to the open position, the biasing mechanism 146 applies a biasing force to the seal 142 in a direction away from the floor surface 120 to thereby return the seal 142 to the relaxed state.

Figure 9A:
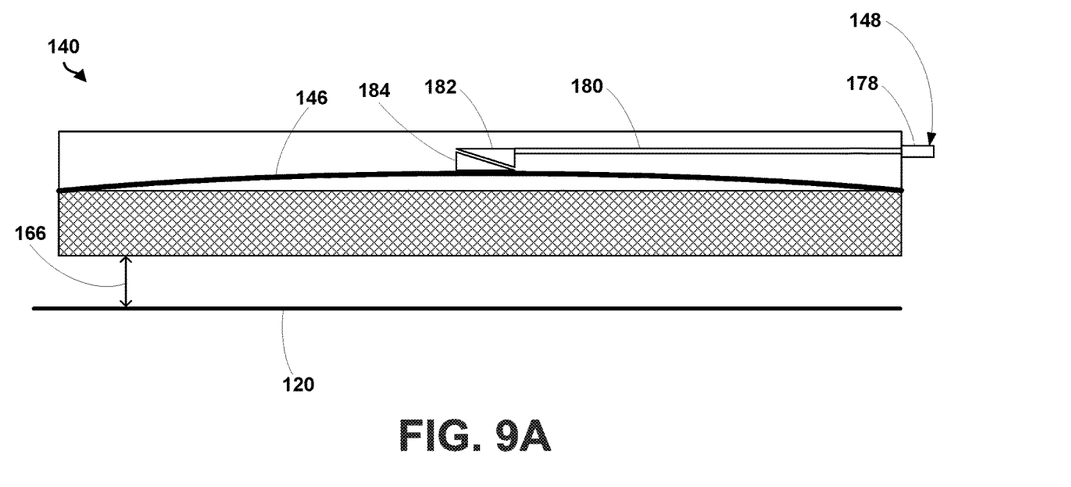
FIG. 9A illustrates a cross-sectional view of another example seal assembly of the galley system in accordance with an exemplary embodiment in a relaxed state.
Figure 9B:
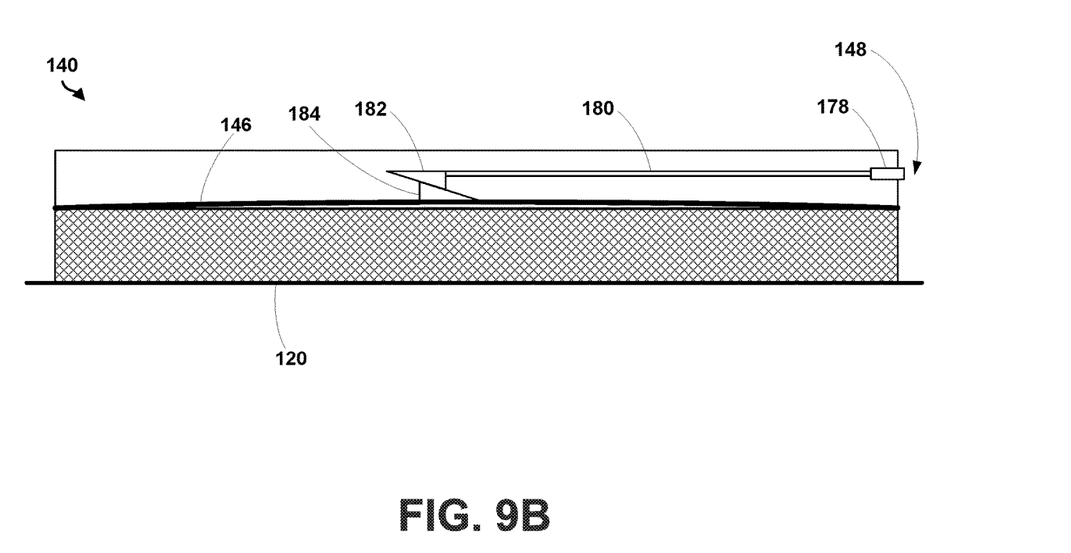
FIG. 9B illustrates a cross-sectional view of the example seal assembly of FIG. 9A in accordance with an exemplary embodiment in a compressed state.

Another example activation mechanism 148 is illustrated in FIGS. 9A-9B. As shown in FIGS. 9A-9B, the activation mechanism 148 may include an actuator pin 178 extending away from the housing 144, and a rod 180 coupled to the actuator pin 178 and extending into the housing 144. Further, as shown in FIGS. 9A-9B, the activation mechanism 148 further comprises a first cam component 182 coupled to the rod 180 and positioned within the housing 144, and a second cam component 184 coupled to the seal 142 and positioned within the housing 144. The first cam component 182 is configured to contact the second cam component 184 when the actuator pin 178 is depressed to thereby transition the seal 142 from the relaxed state to the compressed state. In one particular example, as illustrated in FIGS. 9A-9B, the first cam component 182 comprises a first wedge having a first angled cam surface, and the second cam component 184 comprises a second wedge having a second angled cam surface. Other cam components are possible as well.

In such an example, as the actuator pin 178 is depressed as the door 132 transitions from the open position to the closed position. As the actuator pin 178 is depressed, the rod 180 moves further into the housing 144, which in turn pushes the first cam component 182 into contact with the second cam component 184. As the first cam component 182 contacts the second cam component 184, the biasing mechanism 146 the seal 142 move towards the floor surface 120 to transition the seal 142 to the compressed state. As the door 132 transitions back to the open position, the biasing mechanism 146 applies a biasing force to the seal 142 in a direction away from the floor surface 120 to thereby return the seal 142 to the relaxed state.

In one example, the housing 144 of the seal assembly 140 is moveable relative to the door 132. In such an example, the housing 144 be moveable relative to the door 132 through the activation mechanism 148, or the housing 144 may include a second activation mechanism that is configured to move the housing 144 with respect to the door 132. As such, the system 100 may include two distinct movements: (i) the housing 144 relative to the door 132, and (ii) the seal 142 relative to the door 132. Such an arrangement may provide increased opportunity for customization of the amount of vertical travel of the seal 142 to ensure a tight seal between the seal assembly 140 and the floor surface 120.

Figure 10:
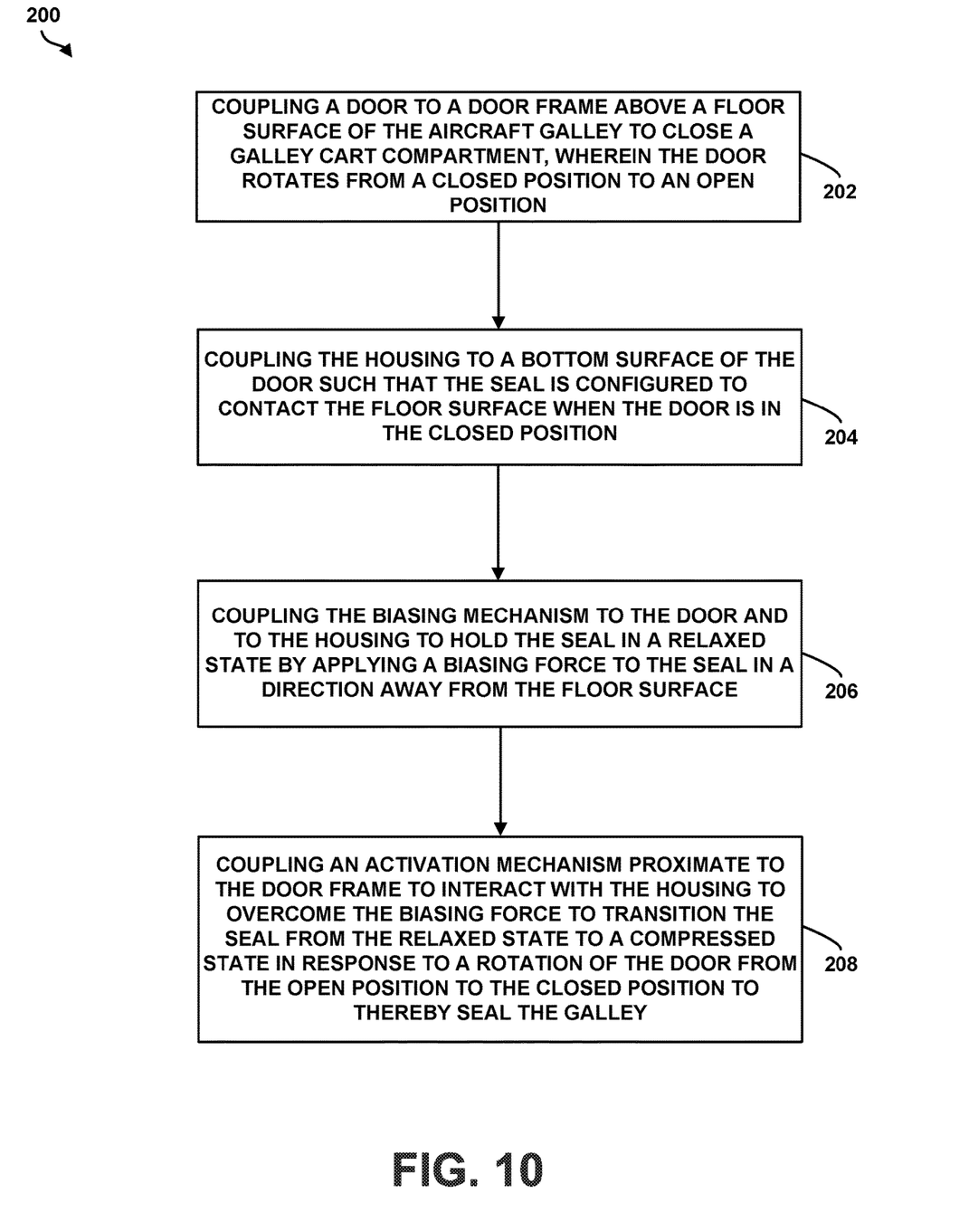
FIG. 10 is a flowchart of a method for sealing a compartment using the system of FIGS. 1-9B.

FIG. 10 is a block diagram of an example of a method 200 of assembling an aircraft galley 104 with a seal assembly 140 including a housing 144, a seal 142 coupled to the housing 144, and a biasing mechanism 146 coupled to the housing 144. Method 200 shown in FIG. 10 presents an embodiment of a method that could be carried out using the system 100 of FIGS. 1-9B, as an example. Method 200 includes one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes coupling a door 132 to a door frame 134 above a floor surface 120 of the galley 104 to close a galley cart compartment 102. The door 132 is configured to rotate from a closed position to an open position. At block 204, the method 200 includes coupling the housing 144 to a bottom surface 138 of the door 132 such that the seal 142 is configured to contact the floor surface 120 when the door 132 is in the closed position. At block 206, the method 200 includes coupling the biasing mechanism 146 to the door 132 and to the housing 144 to hold the seal 142 in a relaxed state by applying a biasing force to the seal 142 in a direction away from the floor surface 120. At block 208, the method 200 includes coupling an activation mechanism 148 proximate to the door frame 134 to interact with the housing 144 to overcome the biasing force to transition the seal 142 from the relaxed state to a compressed state in response to a rotation of the door 132 from the open position to the closed position. As discussed above, a height of the seal 142 is greater in the relaxed state than in the compressed state.

In one example, as discussed above, the bottom surface 138 of the door includes a cavity 168 between the front wall 124 of the door 132 and the rear wall 126 of the door, and the housing 144 is positioned at least partially in the cavity 168.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts were described in conjunction with specific examples, it will be understood that these examples are not intended to be limiting.

In FIG. 10, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" or "one embodiment" means that one or more feature, structure, or characteristic described in connection with the example is included in at least one implementation. The phrase "one example" or "one embodiment" in various places in the specification may or may not be referring to the same example or embodiment.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

The limitations of the following claims are not written in means-plus-function format and are not intended to be interpreted based on 35 U.S.C. § 112(f), unless and until such claim limitations expressly use the phrase "means for" followed by a statement of function void of further structure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for sealing a refrigerated galley of an aircraft, the system comprising:
   a door having a top surface, a bottom surface opposite the top surface, a first side surface, and a second side surface opposite the first side surface; and
   a seal assembly positioned at the bottom surface of the door, the seal assembly comprising:
      a housing coupled to the bottom surface of the door;
      a seal positioned at least partially in the housing, wherein the seal is moveable relative to the housing and the door;
      a biasing mechanism coupled to the housing and the seal, wherein the biasing mechanism is configured to hold the seal in a relaxed state by applying a biasing force to the seal in a direction away from a floor surface of the refrigerated galley; and
      an activation mechanism coupled to the housing, wherein the activation mechanism is configured to transition the seal from the relaxed state to a compressed state in response to a rotation of the door from an open position to a closed position, wherein a height of the seal is greater in the relaxed state than in the compressed state,
      wherein, when the seal transitions to the relaxed state, the seal moves vertically with respect to the door, and
      wherein, as the seal transitions from the compressed state to the relaxed state in response to the rotation of the door from the closed position to the open position, a portion of the seal closer to the activation mechanism translates vertically before a portion of the seal further away from the activation mechanism.

2. The system of claim 1, wherein the biasing mechanism comprises a leaf spring.

3. The system of claim 1, wherein the biasing mechanism comprises a first biasing mechanism, the system further comprising:
   a second biasing mechanism coupled to the housing and the seal, wherein the second biasing mechanism is positioned in parallel with the first biasing mechanism.

4. The system of claim 1, further comprising:
   a second seal positioned on the top surface of the door; and
   a third seal positioned on the first side surface of the door.

5. The system of claim 1, further comprising:
   a first edge seal positioned between the housing and the seal adjacent a first side of the housing; and
   a second edge seal positioned between the housing and the seal adjacent a second side of the housing opposite the first side of the housing, wherein the first edge seal and the second edge seal prevent refrigerated air from exiting the refrigerated galley of the aircraft when the door is in the closed position.

6. The system of claim 1, wherein the bottom surface of the door includes a cavity between a front wall and a rear wall of the door, and wherein the housing is positioned at least partially in the cavity.

7. The system of claim 1, wherein the activation mechanism comprises:
   an actuator pin extending away from the housing; and
   a rod coupled to the actuator pin and extending into the housing, wherein the rod is further coupled to the biasing mechanism.

8. The system of claim 1, wherein the activation mechanism comprises:
   an actuator pin extending away from the housing;
   a rod coupled to the actuator pin and extending into the housing;
   a first cam component coupled to the rod and positioned within the housing; and
   a second cam component coupled to the seal and positioned within the housing, wherein the first cam component is configured to contact the second cam component when the actuator pin is depressed to thereby transition the seal from the relaxed state to the compressed state.

9. The system of claim 8, wherein the first cam component comprises a first wedge having a first angled cam surface, and wherein the second cam component comprises a second wedge having a second angled cam surface.

10. The system of claim 1, wherein the seal comprises an elastomeric material, a brush material, or a combination thereof.

11. The system of claim 1, wherein the housing is moveable relative to the door.

12. The system of claim 1, wherein the seal is removably positioned in the housing.

13. A galley for an aircraft comprising:
   a refrigerated cart compartment;
   a door frame defining a front wall of the refrigerated cart compartment;
   a door coupled to the door frame at a hinge, the door having a top surface, a bottom surface opposite the top surface, a first side surface, and a second side surface opposite the first side surface; and
   a seal assembly positioned at the bottom surface of the door, the seal assembly comprising:
      a housing coupled to the bottom surface of the door;
      a seal positioned at least partially in the housing, wherein the seal is moveable relative to the housing and the door;
      a biasing mechanism coupled to the housing and the seal, wherein the biasing mechanism is configured to hold the seal in a relaxed state by applying a biasing force to the seal in a direction away from a floor surface of the galley; and
      an activation mechanism coupled to the housing, wherein the activation mechanism is configured to transition the seal from the relaxed state to a compressed state in response to a rotation of the door from an open position to a closed position, wherein a height of the seal is greater in the relaxed state than in the compressed state,
      wherein, when the seal transitions to the relaxed state, the seal moves vertically with respect to the door, and
      wherein, as the seal transitions from the compressed state to the relaxed state in response to the rotation of the door from the closed position to the open position, a portion of the seal closer to the activation mechanism translates vertically before a portion of the seal further away from the activation mechanism.

14. The galley of claim 13, further comprising:
   a first edge seal positioned between the housing and the seal adjacent a first side of the housing; and
   a second edge seal positioned between the housing and the seal adjacent a second side of the housing opposite the first side of the housing, wherein the first edge seal and the second edge seal prevent refrigerated air from exiting the refrigerated cart compartment of the galley when the door is in the closed position.

15. The galley of claim 13, wherein the activation mechanism comprises:
   an actuator pin extending away from the housing; and
   a rod coupled to the actuator pin and extending into the housing, wherein the rod is further coupled to the biasing mechanism, wherein the actuator pin is configured to contact the door frame to thereby transition the seal from the relaxed state to the compressed state.

16. The galley of claim 13, wherein the activation mechanism comprises:
   an actuator pin extending away from the housing;
   a rod coupled to the actuator pin and extending into the housing;
   a first cam component coupled to the rod and positioned within the housing; and
   a second cam component coupled to the seal and positioned within the housing, wherein the actuator pin is configured to contact the door frame to depress the actuator pin and cause the first cam component to contact the second cam component to thereby transition the seal from the relaxed state to the compressed state.

17. The galley of claim 16, wherein the first cam component comprises a first wedge having a first angled cam surface, and wherein the second cam component comprises a second wedge having a second angled cam surface.

18. The galley of claim 13, wherein the housing is moveable relative to the door.

19. A method of assembling an aircraft galley with a seal assembly including a housing, a seal coupled to the housing, and a biasing mechanism coupled to the housing, the method comprising:
   coupling a door to a door frame above a floor surface of the aircraft galley to close a galley cart compartment, wherein the door rotates from a closed position to an open position;
   coupling the housing to a bottom surface of the door such that the seal is configured to contact the floor surface when the door is in the closed position;
   coupling the biasing mechanism to the door and to the housing to hold the seal in a relaxed state by applying a biasing force to the seal in a direction away from the floor surface; and
   coupling an activation mechanism proximate to the door frame to interact with the housing to overcome the biasing force to transition the seal from the relaxed state to a compressed state in response to a rotation of the door from the open position to the closed position to thereby seal the aircraft galley, wherein a height of the seal is greater in the relaxed state than in the compressed state,
   wherein, when the seal transitions to the relaxed state, the seal moves vertically with respect to the door, and
   wherein, as the seal transitions from the compressed state to the relaxed state in response to the rotation of the door from the closed position to the open position, a portion of the seal closer to the activation mechanism translates vertically before a portion of the seal further away from the activation mechanism.

20. The method of claim 19, wherein the bottom surface of the door includes a cavity between a front wall and a rear wall of the door, and wherein the housing is positioned at least partially in the cavity.

* * * * *